US 9,400,851 B2

(12) United States Patent
Shatz et al.

(10) Patent No.: US 9,400,851 B2
(45) Date of Patent: Jul. 26, 2016

(54) DYNAMIC CONTENT CACHING

(75) Inventors: Gur Shatz, Rehovot (IL); Boris Zingerman, Rehovot (IL); Ohad Almagor, Kfar Saba (IL)

(73) Assignee: INCAPSULA, INC., Dover, DE (US)

(*) Notice: Subject to any disclaimer, the term of this patent is extended or adjusted under 35 U.S.C. 154(b) by 713 days.

(21) Appl. No.: 13/167,130

(22) Filed: Jun. 23, 2011

(65) Prior Publication Data
US 2012/0331228 A1 Dec. 27, 2012

(51) Int. Cl.
*G06F 17/30* (2006.01)
*G06F 12/08* (2006.01)

(52) U.S. Cl.
CPC ...... *G06F 17/30902* (2013.01); *G06F 12/0802* (2013.01); *G06F 12/0862* (2013.01); *G06F 12/0864* (2013.01); *G06F 12/0866* (2013.01); *G06F 12/0897* (2013.01)

(58) Field of Classification Search
CPC ............ G06F 12/0802; G06F 12/0866; G06F 12/0862; G06F 12/0864; G06F 12/0897; G06F 17/30902; G06F 17/30; G06F 12/08
See application file for complete search history.

(56) References Cited

U.S. PATENT DOCUMENTS

| | | | |
|---|---|---|---|
| 6,351,767 B1 | 2/2002 | Batchelder et al. | |
| 6,408,360 B1 | 6/2002 | Chamberlain et al. | |
| 6,453,319 B1 * | 9/2002 | Mattis et al. | |
| 6,584,548 B1 | 6/2003 | Bourne et al. | |
| 6,757,708 B1 | 6/2004 | Craig et al. | |
| 6,823,374 B2 | 11/2004 | Kausik et al. | |
| 6,832,222 B1 | 12/2004 | Zimowski | |
| 6,915,307 B1 * | 7/2005 | Mattis et al. | |
| 6,993,591 B1 * | 1/2006 | Klemm | 709/232 |
| 7,020,736 B1 * | 3/2006 | Cherukuri | 711/5 |
| 7,076,500 B2 * | 7/2006 | Gallant et al. | 711/118 |
| 7,096,418 B1 | 8/2006 | Singhal et al. | |
| 7,171,443 B2 * | 1/2007 | Tiemann et al. | 709/203 |
| 7,320,023 B2 * | 1/2008 | Chintalapati et al. | 709/216 |
| 7,330,938 B2 * | 2/2008 | Nenov et al. | 711/135 |
| 7,343,412 B1 | 3/2008 | Zimowski | |
| 7,460,038 B2 | 12/2008 | Samuels et al. | |
| 7,532,134 B2 | 5/2009 | Samuels et al. | |
| 7,584,294 B2 | 9/2009 | Plamondon | |

(Continued)

OTHER PUBLICATIONS

Webopedia, "Message Digest", Apr. 5, 2001, pp. 1-2, https://web.archive.org/web/20010405165043/http://webopedia.com/TERM/M/message_digest.htm I.*

(Continued)

*Primary Examiner* — Christopher D Birkhimer
(74) *Attorney, Agent, or Firm* — Sughrue Mion, PLLC

(57) ABSTRACT

A system for caching content including a server supplying at least one of static and non-static content elements, content distinguishing functionality operative to categorize elements of the non-static content as being either dynamic content elements or pseudodynamic content elements, and caching functionality operative to cache the pseudodynamic content elements. The static content elements are content elements which are identified by at least one of the server and metadata associated with the content elements as being expected not to change, the non-static content elements are content elements which are not identified by the server and/or by metadata associated with the content elements as being static content elements, the pseudodynamic content elements are non-static content elements which, based on observation, are not expected to change, and the dynamic content elements are non-static content elements which are not pseudodynamic.

58 Claims, 5 Drawing Sheets

(56) References Cited

U.S. PATENT DOCUMENTS

| | | | |
|---|---|---|---|
| 7,619,545 B2 | 11/2009 | Samuels et al. | |
| 7,681,221 B2 * | 3/2010 | Kondo | G06F 17/30017 348/561 |
| 7,706,266 B2 | 4/2010 | Plamondon | |
| 7,720,936 B2 | 5/2010 | Plamondon | |
| 7,720,954 B2 | 5/2010 | Raja et al. | |
| 7,760,642 B2 | 7/2010 | Plamondon | |
| 7,774,487 B2 * | 8/2010 | Chaudhry | H04L 63/0823 709/223 |
| 7,783,757 B2 | 8/2010 | Plamondon | |
| 7,796,510 B2 | 9/2010 | Plamondon | |
| 7,809,818 B2 | 10/2010 | Plamondon | |
| 7,827,237 B2 | 11/2010 | Plamondon | |
| 7,843,912 B2 | 11/2010 | Harris et al. | |
| 7,844,624 B2 * | 11/2010 | Kinno | G06F 17/30817 707/783 |
| 7,865,585 B2 | 1/2011 | Samuels et al. | |
| 7,872,597 B2 | 1/2011 | Samuels et al. | |
| 7,916,047 B2 | 3/2011 | Samuels et al. | |
| 7,945,698 B2 * | 5/2011 | Bannoura et al. | 709/247 |
| 7,962,594 B2 * | 6/2011 | Kasriel et al. | 709/223 |
| 7,966,414 B2 * | 6/2011 | Cinghita et al. | 709/231 |
| 2002/0120710 A1 | 8/2002 | Chintalapati et al. | |
| 2003/0004998 A1 | 1/2003 | Datta | |
| 2003/0055792 A1 | 3/2003 | Kinoshita et al. | |
| 2003/0152904 A1 * | 8/2003 | Doty, Jr. | G09B 7/00 434/350 |
| 2004/0044731 A1 | 3/2004 | Chen et al. | |
| 2005/0240732 A1 | 10/2005 | Crick et al. | |
| 2005/0278259 A1 | 12/2005 | Gunaseelan et al. | |
| 2007/0005511 A1 | 1/2007 | Martinez | |
| 2007/0192344 A1 | 8/2007 | Meier et al. | |
| 2007/0206497 A1 | 9/2007 | Plamondon et al. | |
| 2007/0206615 A1 | 9/2007 | Plamondon et al. | |
| 2007/0206621 A1 | 9/2007 | Plamondon et al. | |
| 2007/0214245 A1 * | 9/2007 | Hamalainen | H04L 12/1859 709/223 |
| 2008/0034057 A1 | 2/2008 | Kumar et al. | |
| 2008/0046371 A1 | 2/2008 | He et al. | |
| 2008/0224906 A1 | 9/2008 | Plamondon | |
| 2008/0228772 A1 | 9/2008 | Plamondon | |
| 2008/0228864 A1 | 9/2008 | Plamondon | |
| 2008/0228939 A1 | 9/2008 | Samuels et al. | |
| 2008/0229017 A1 | 9/2008 | Plamondon | |
| 2008/0229020 A1 | 9/2008 | Plamondon | |
| 2008/0229024 A1 * | 9/2008 | Plamondon | 711/126 |
| 2008/0229025 A1 | 9/2008 | Plamondon | |
| 2008/0229137 A1 | 9/2008 | Samuels et al. | |
| 2008/0288722 A1 * | 11/2008 | Lecoq et al. | 711/130 |
| 2009/0049243 A1 | 2/2009 | Dubrovsky et al. | |
| 2010/0199245 A1 | 8/2010 | Levy | |
| 2010/0199345 A1 | 8/2010 | Nadir | |
| 2010/0251347 A1 * | 9/2010 | Roskind | G06F 21/31 726/5 |
| 2011/0029641 A1 * | 2/2011 | Fainberg et al. | 709/219 |
| 2011/0138012 A1 * | 6/2011 | Tiemann et al. | 709/217 |
| 2012/0143770 A1 | 6/2012 | Pauker et al. | |

OTHER PUBLICATIONS

Webopedia, "Byte", Apr. 10, 2001, pp. 1-2, https://web.archive.org/web/20010410183831/http://www.webopedia.com/TERM/b/byte.html.*

Webopedia, "One-Way Hash Function", Apr. 5, 2001, pp. 1-2, https://web.archive.org/web/20010405170900/http://webopedia.com/TERM/O/one-way_hash_fu nction.htm I.*

Webopedia, "Hashing", Apr. 11, 2001, pp. 1-2, https://web.archive.org/web/20010411005933/http://webopedia.com/term/H/hashing.html.*

Webopedia, "Message Digest", Aug. 29, 1998, pp. 1-2, https://web.archive.org/web/20010405165043/http://webopedia.com/TERM/M/message_digest. htm I.*

An International Search Report and a Written Opinion both dated Sep. 4, 2012, which issued during the prosecution of Applicant's PCT/IL2012/000174.

An International Search Report and a Written Opinion both dated Nov. 7, 2013, which issued during the prosecution of Applicant's PCT/IL2013/050528.

An International Preliminary Report on Patentability dated Dec. 23, 2013, which issued during the prosecution of Applicant's PCT/IL2012/000174.

Communication dated May 21, 2015 from the European Patent Office issued in corresponding European application No. 12803134.1.

* cited by examiner

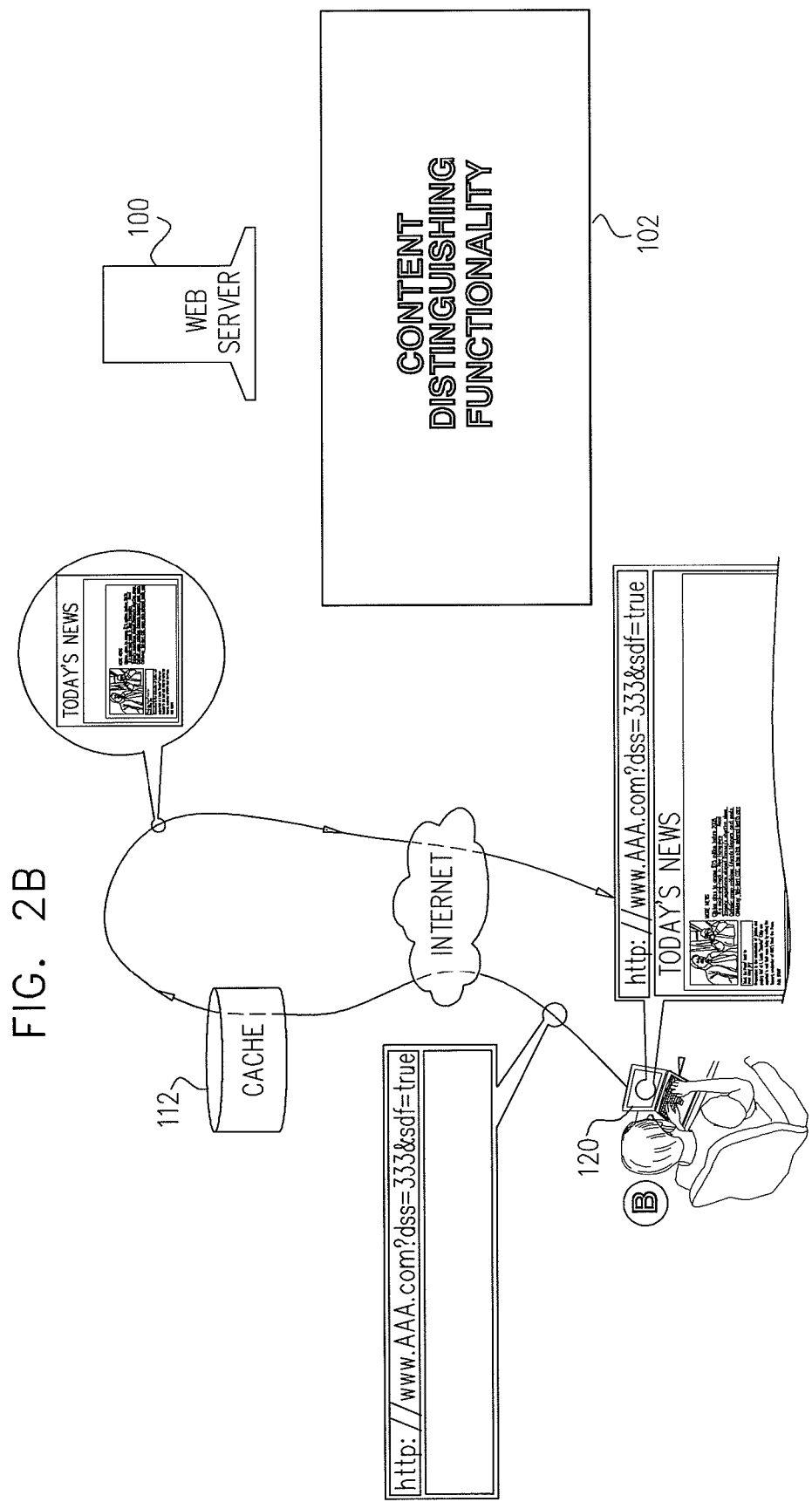

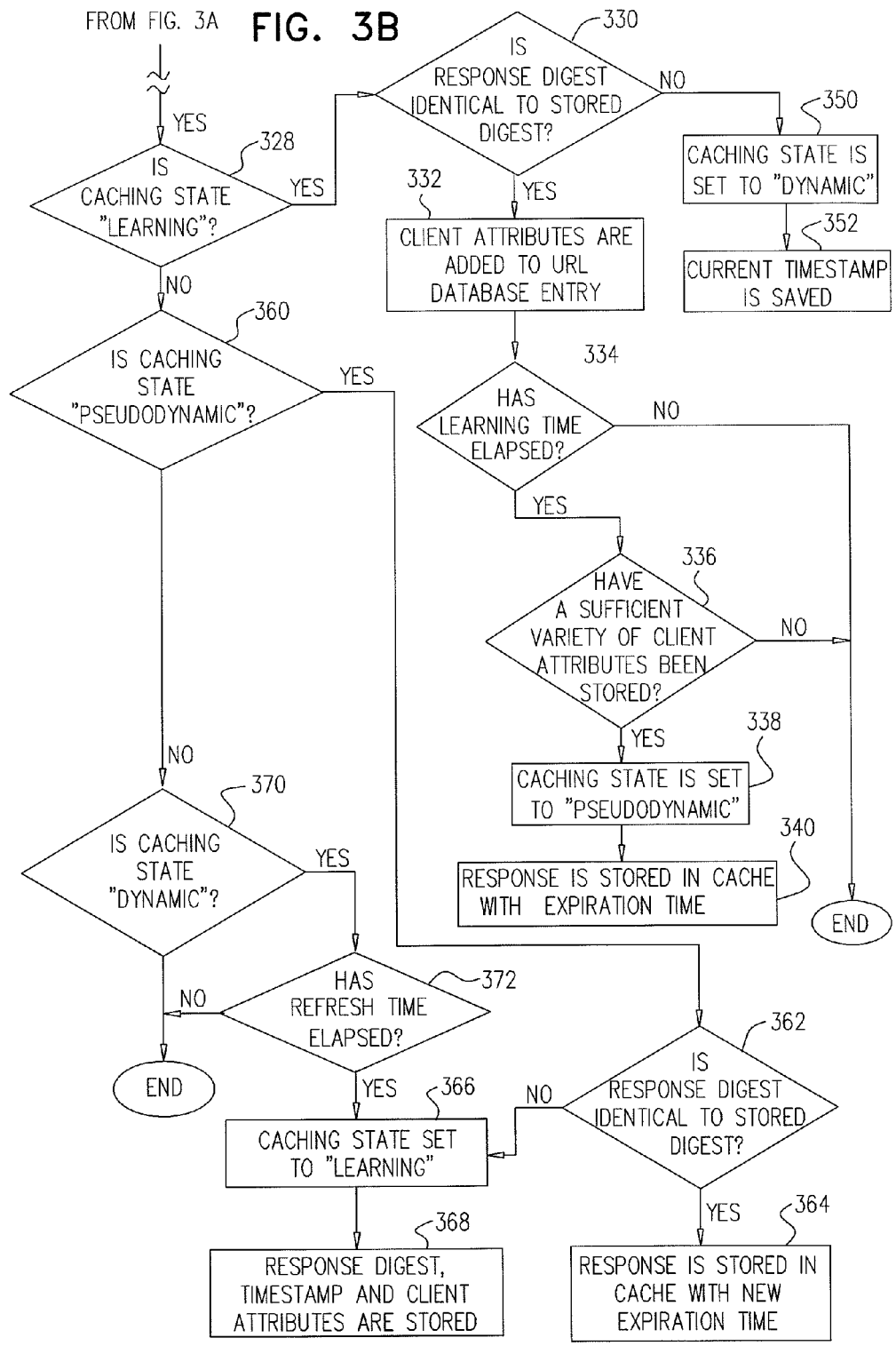

DYNAMIC CONTENT CACHING

FIELD OF THE INVENTION

The present invention relates to dynamic content caching systems and methods.

BACKGROUND OF THE INVENTION

The following patent publications are believed to represent the current state of the art:

U.S. Pat. Nos. 6,351,767; 6,408,360; 6,757,708; 6,823,374; 7,096,418; 7,320,023; 7,343,412; and U.S. Published Patent Application Nos.: 2002/0120710; 2003/0004998; 2004/90044731; 2005/0240732; 2009/0049243.

SUMMARY OF THE INVENTION

The present invention provides improved systems and methodologies for dynamic content caching.

There is thus provided in accordance with a preferred embodiment of the present invention a system for caching content including a server supplying at least one of static and non-static content elements, content distinguishing functionality operative to categorize elements of the non-static content as being either dynamic content elements or pseudodynamic content elements, and caching functionality operative to cache the pseudodynamic content elements.

In accordance with a preferred embodiment of the present invention the static content elements are content elements which are identified by at least one of the server and metadata associated with the content elements as being expected not to change, the non-static content elements are content elements which are not identified by the server and/or by metadata associated with the content elements as being static content elements, the pseudodynamic content elements are non-static content elements which, based on observation, are not expected to change, and the dynamic content elements are non-static content elements which are not pseudodynamic.

Preferably, the content distinguishing functionality is operative to distinguish between the dynamic content and the pseudodynamic content by distinguishing between content downloaded to disparate clients that has a changing byte content and content that has a static byte content.

Preferably, the caching functionality is operative to ascertain whether the content is cached upon receiving a content request from a client, the content request including a full URL. Preferably, the caching functionality is operative to provide the content to the client upon ascertaining that the content is cached. Alternatively, the caching functionality is operative to route the content request to a web server which hosts the full URL upon ascertaining that the content is not cached. Preferably, the client is operative to receive a response from the web server to the content request. Additionally or alternatively, the content distinguishing functionality is operative to receive a response from the web server to the content request.

Preferably, the content distinguishing functionality includes a URL database which stores a list of previously processed full URLs which were previously processed by the content distinguishing functionality. Preferably, the database stores a caching state associated with the previously processed full URL for each previously processed full URL stored in the URL database.

Preferably, the content distinguishing functionality is also operative to receive the full URL and attributes of the client. Preferably, the attributes include source IP, session ID, user agent and screen size. Preferably, the content distinguishing functionality is also operative to receive a digest of the response and a timestamp of the response. Preferably, the content distinguishing functionality is also operative to calculate a digest of the response and a timestamp of the response. Preferably, the content distinguishing functionality is also operative to ascertain whether the full URL is stored in the URL database.

Preferably, the content distinguishing functionality is operative to store the full URL, the digest, the timestamp and the attributes in the URL database, and to set a stored caching state corresponding to the full URL to "learning" when the full URL is not stored in the URL database. Alternatively, the content distinguishing functionality is also operative to ascertain whether the stored caching state corresponding to the full URL is one of "learning", "pseudodynamic" and "dynamic" when the full URL is stored in the URL database.

Preferably, the content distinguishing functionality is also operative to ascertain whether the digest is identical to a stored digest corresponding to the URL when the stored caching state is "learning". Additionally, the content distinguishing functionality is also operative to store the attributes in the URL database when the digest is identical to a stored digest corresponding to the URL, and responsive to a predefined learning time having elapsed since the stored caching state was initially set as "learning" and a predefined sufficient variety of client attributes having been stored over a predefined minimum number of responses associated with the URL said content distinguishing functionality is also operative to set the caching state as "pseudodynamic", and to store the response in the cache with a predefined caching expiration time. Alternatively, the caching state of the URL is set as "dynamic" and the timestamp is stored when the digest is not identical to a stored digest corresponding to the URL. Preferably, the variety of client attributes includes a minimum number of distinct IP addresses in combination with a minimum number of distinct user agents. Preferably, the predefined caching expiration time is shorter than the learning time.

Alternatively, the content distinguishing functionality is also operative to ascertain whether the digest is identical to a stored digest corresponding to the URL when the stored caching state is "pseudodynamic". Preferably, the response is stored in the cache with a new caching expiration time associated therewith when the digest is identical to a stored digest corresponding to the URL. Alternatively, the caching state of the URL is set as "learning" and the digest, the timestamp and the attributes are stored when the digest is not identical to a stored digest corresponding to the URL. Preferably, the new caching expiration time is equal to the predefined caching expiration time. Alternatively, the new caching expiration time is not equal to the predefined caching expiration time.

Alternatively, the content distinguishing functionality is also operative to ascertain whether a predefined amount of refresh time has elapsed since a stored timestamp of the URL when the stored caching state is "dynamic". Preferably, the caching state of the URL is set as "learning" and the digest, the timestamp and the attributes are stored in the entry when a predefined amount of refresh time has elapsed since a stored timestamp of the URL.

There is also provided in accordance with another preferred embodiment of the present invention content distinguishing functionality operative in a system for serving content including a server supplying at least one of static content and non-static content, the content distinguishing functionality being operative to categorize elements of the non-static content as being either dynamic content elements or pseudodynamic content elements, and caching functionality operative to cache the pseudodynamic content.

Preferably, the static content elements are content elements which are identified by at least one of the server and metadata associated with the content elements as being expected not to change, the non-static content elements are content elements which are not identified by the server and/or by metadata associated with the content elements as being static content elements, the pseudodynamic content elements are non-static content elements which, based on observation, are not expected to change, and the dynamic content elements are non-static content elements which are not pseudodynamic.

Preferably, the content distinguishing functionality is operative to distinguish between the dynamic content and the pseudodynamic content by distinguishing between content downloaded to disparate clients that has a changing byte content and content that has a static byte content.

There is further provided in accordance with yet another preferred embodiment of the present invention a method for caching content including supplying at least one of static and non-static content elements, categorizing elements of the non-static content as being either dynamic content elements or pseudodynamic content elements, and caching the pseudodynamic content.

In accordance with a preferred embodiment of the present invention the static content elements are content elements which are identified by at least one of the server and metadata associated with the content elements as being expected not to change, the non-static content elements are content elements which are not identified by the server and/or by metadata associated with the content elements as being static content elements, the pseudodynamic content elements are non-static content elements which, based on observation, are not expected to change, and the dynamic content elements are non-static content elements which are not pseudodynamic.

Preferably, the categorizing includes distinguishing between the dynamic content and the pseudodynamic content by distinguishing between content downloaded to disparate clients that has a changing byte content and content that has a static byte content.

Preferably, the categorizing also includes ascertaining whether the content is cached upon receiving a content request including a full URL from a client. Preferably, the categorizing includes providing the content to the client upon ascertaining that the content is cached. Alternatively, the categorizing includes routing the content request to a web server which hosts the full URL upon ascertaining that the content is not cached. Preferably, the client is operative to receive a response from the web server to the content request. Additionally or alternatively, the categorizing also includes receiving a response from the web server to the content request.

Preferably, the categorizing also includes storing a list of previously processed full URLs. Preferably, a caching state associated with the previously processed full URL is stored for each stored previously processed full URL.

Preferably, the categorizing also includes receiving the full URL and attributes of the client. Preferably, the attributes include source IP, session ID, user agent and screen size. Preferably, the categorizing also includes receiving a digest of the response and a timestamp of the response. Preferably, the categorizing also includes calculating a digest of the response and a timestamp of the response. Preferably, the categorizing also includes ascertaining whether the full URL is stored in the URL database.

Preferably, the categorizing includes storing the full URL, the digest, the timestamp and the attributes and setting a stored caching state corresponding to the full URL to "learning" when the full URL is not stored. Alternatively, the categorizing also includes ascertaining whether the stored caching state corresponding to the full URL is one of "learning", "pseudodynamic" and "dynamic" when the full URL is stored.

Preferably, the categorizing also includes ascertaining whether the digest is identical to a stored digest corresponding to the URL when the stored caching state is "learning". Additionally, the categorizing also includes storing the attributes when the digest is identical to a stored digest corresponding to the URL, and responsive to a predefined learning time having elapsed since the stored caching state was initially set as "learning" and a predefined sufficient variety of client attributes having been stored over a predefined minimum number of responses associated with the URL the categorizing also includes setting the caching state as "pseudodynamic", and caching the response with a predefined caching expiration time. Alternatively, the caching state of the URL is set as "dynamic" and the timestamp is stored when the digest is not identical to a stored digest corresponding to the URL. Preferably, the variety of client attributes includes a minimum number of distinct IP addresses in combination with a minimum number of distinct user agents. Preferably, the predefined caching expiration time is shorter than the learning time.

Alternatively, the categorizing also includes ascertaining whether the digest is identical to a stored digest corresponding to the URL when the stored caching state is "pseudodynamic". Preferably, the response is cached with a new caching expiration time associated therewith when the digest is identical to a stored digest corresponding to the URL. Alternatively, the caching state of the URL is set as "learning", and the digest, the timestamp and the attributes are stored when the digest is not identical to a stored digest corresponding to the URL. Preferably, the new caching expiration time is equal to the predefined caching expiration time. Alternatively, the new caching expiration time is not equal to the predefined caching expiration time.

Alternatively, the categorizing also includes ascertaining whether a predefined amount of refresh time has elapsed since a stored timestamp of the URL when the stored caching state is "dynamic". Preferably, the caching state of the URL is set as "learning", and the digest, the timestamp and the attributes are stored in the entry when a predefined amount of refresh time has elapsed since a stored timestamp of the URL.

There is yet further provided in accordance with still another preferred embodiment of the present invention a content distinguishing method operative in a system for serving content including a server supplying at least one of static content and non-static content, the content distinguishing method including categorizing elements of the non-static content as being either dynamic content elements or pseudodynamic content elements, and caching functionality operative to cache the pseudodynamic content.

Preferably, the static content elements are content elements which are identified by at least one of the server and metadata associated with the content elements as being expected not to change, the non-static content elements are content elements which are not identified by the server and/or by metadata associated with the content elements as being static content elements, the pseudodynamic content elements are non-static content elements which, based on observation, are not expected to change, and the dynamic content elements are non-static content elements which are not pseudodynamic.

Preferably, the categorizing includes distinguishing between the dynamic content and the pseudodynamic content by distinguishing between content downloaded to disparate clients that has a changing byte content and content that has a static byte content.

BRIEF DESCRIPTION OF THE DRAWINGS

The present invention will be understood and appreciated more fully from the following detailed description, taken in conjunction with the drawings in which:

FIGS. 2A and 2B are simplified illustrations of the operation of a system for serving content including the system for caching content of FIG. 1; and FIGS. 3A and 3B together are a simplified flow chart illustrating the operation of content distinguishing functionality forming part of the system of FIGS. 1-2B.

DETAILED DESCRIPTION OF PREFERRED EMBODIMENTS

Figure 1:
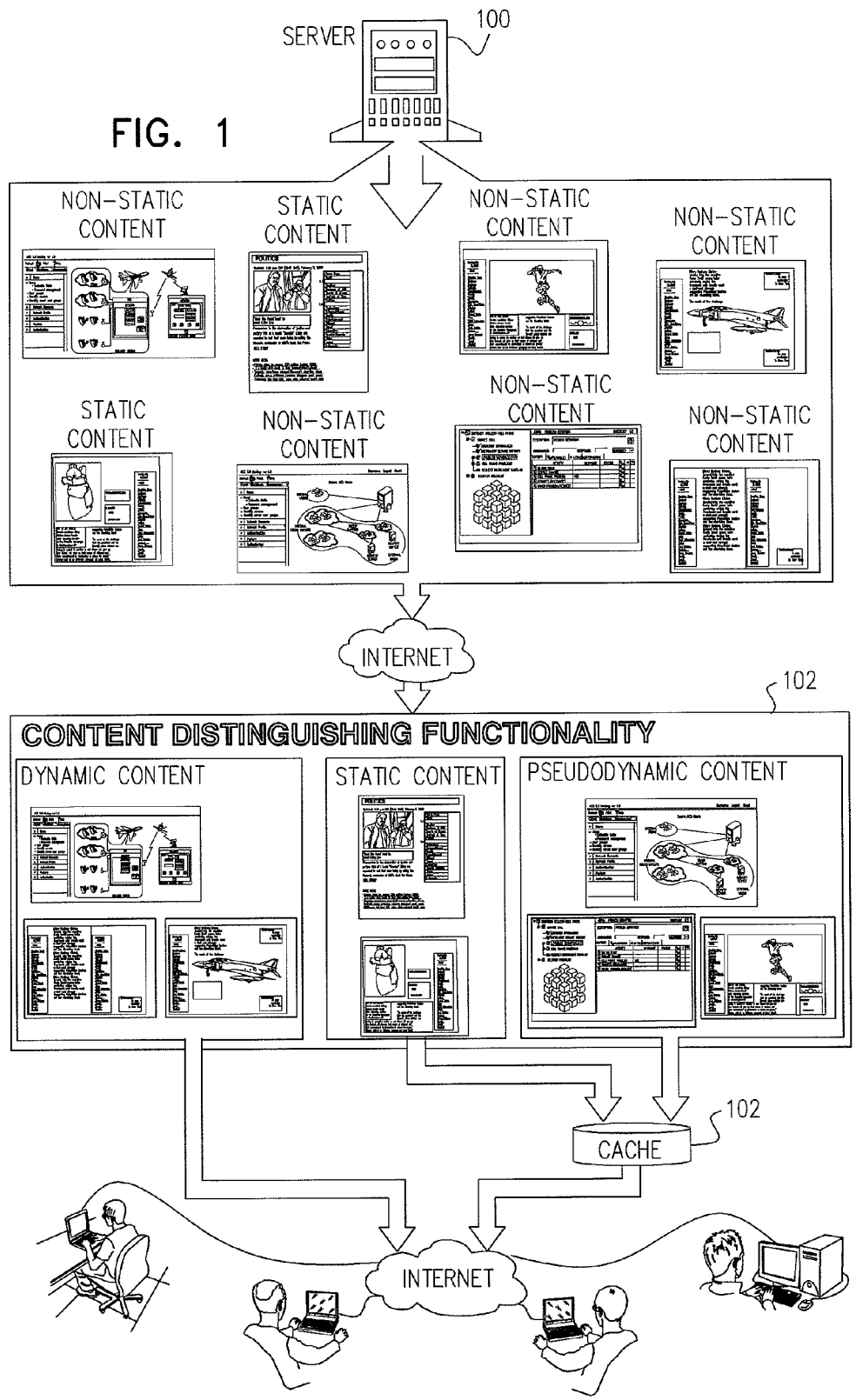
FIG. 1 is a simplified, generalized illustration of the operation of a system for caching content constructed and operative in accordance with a preferred embodiment of the present invention.

Reference is now made to FIG. 1, which is a simplified, generalized illustration of the operation of a system for caching content constructed and operative in accordance with a preferred embodiment of the present invention.

As seen in FIG. 1, a server 100, such as a web server which may be stand alone or serve content provided by an application server (not shown), provides content which includes non-static content and may also provide static content.

For the purposes of the present application, the term "static content" is defined as content which is identified by the web server providing the content and/or by metadata associated with the content as content that is not expected to change over at least a predetermined time and in response to a predetermined number of content requests.

For the purposes of the present application, the term "non-static content" is defined as content which is not identified by the web server providing the content and/or by metadata associated with the content as content that is static.

In accordance with a preferred embodiment of the present invention, the system includes, in addition to server 100, content distinguishing functionality 102 operative to distinguish between non-static content that is dynamic content and non-static content which is pseudodynamic content, and caching functionality 104 operative to cache the static content and the pseudodynamic content.

For the purposes of the present application, the term "pseudodynamic content" is defined as non-static content which based on observation, is not expected to change over a predetermined time.

For the purposes of the present application, the term "dynamic content" is defined as non-static content which is not "pseudodynamic content".

Figure 2A:
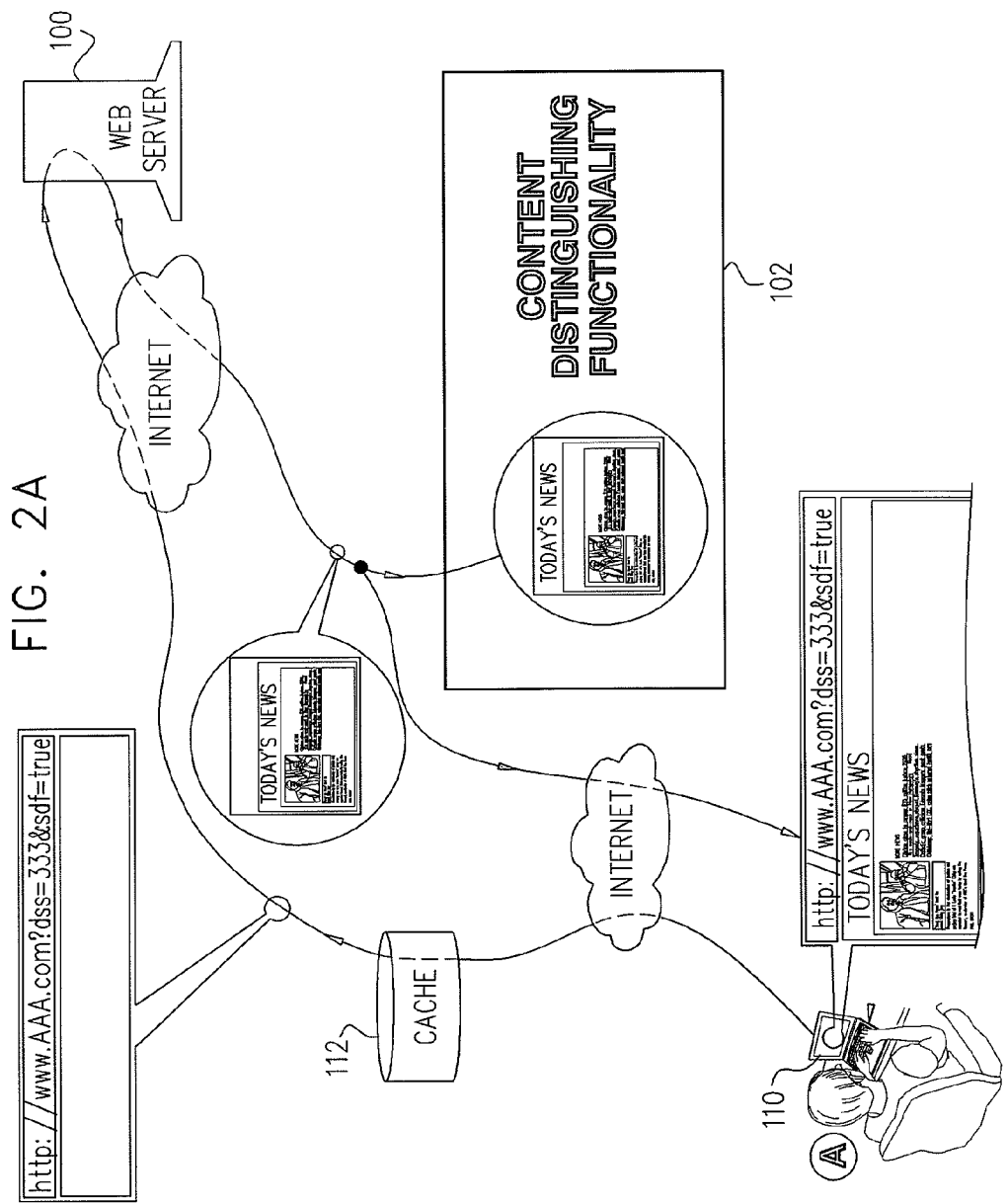

Reference is now made to FIGS. 2A and 2B, which are simplified illustrations of the operation of a system for serving content including the system for caching content of FIG. 1.

Turning to FIG. 2A, it is seen that a user, designated by the letter A, using an internet access device 110, such as a laptop computer, requests a web page, typically designated by a full URL. The term "full URL" is used throughout to refer to a URL combined with a query string. The full URL preferably addresses a web server, such as web server 100 (FIG. 1). The request is routed to a web caching proxy 112 which serves the web page if cached therein and otherwise reroutes the request to web server 100.

In the present example, the requested web page is not cached and web server 100 serves the requested web page to the requesting internet access device 110. It is a particular feature of the present invention that the requested web page is also provided to content distinguishing functionality 102 (FIG. 1). Content distinguishing functionality 102 preferably stores information relating to the content of the served web page and its URL and may store additional information relating to the request.

In accordance with a preferred embodiment of the present invention, the content distinguishing functionality makes a determination based on earlier stored information as to whether the content is static, dynamic or pseudodynamic. Alternatively, the static content may be directly supplied to web caching proxy 112 and need not be supplied to the content distinguishing functionality. In accordance with a preferred embodiment of the present invention, the pseudodynamic content is stored in web caching proxy 112.

Turning to FIG. 2B, it is seen that a subsequent user, designated by the letter B, using an internet access device 120, such as a laptop computer, requests the same web page as earlier requested at least by user A, typically designated by a full URL, which preferably addresses a web server, such as web server 100 (FIG. 1). The request is routed to a web caching proxy 112 which serves the web page if cached therein and otherwise reroutes the request to web server 100.

In the present example, the requested web page is already cached and web caching proxy 112 serves the requested web page to the requesting internet access device 120.

Figure 3A:
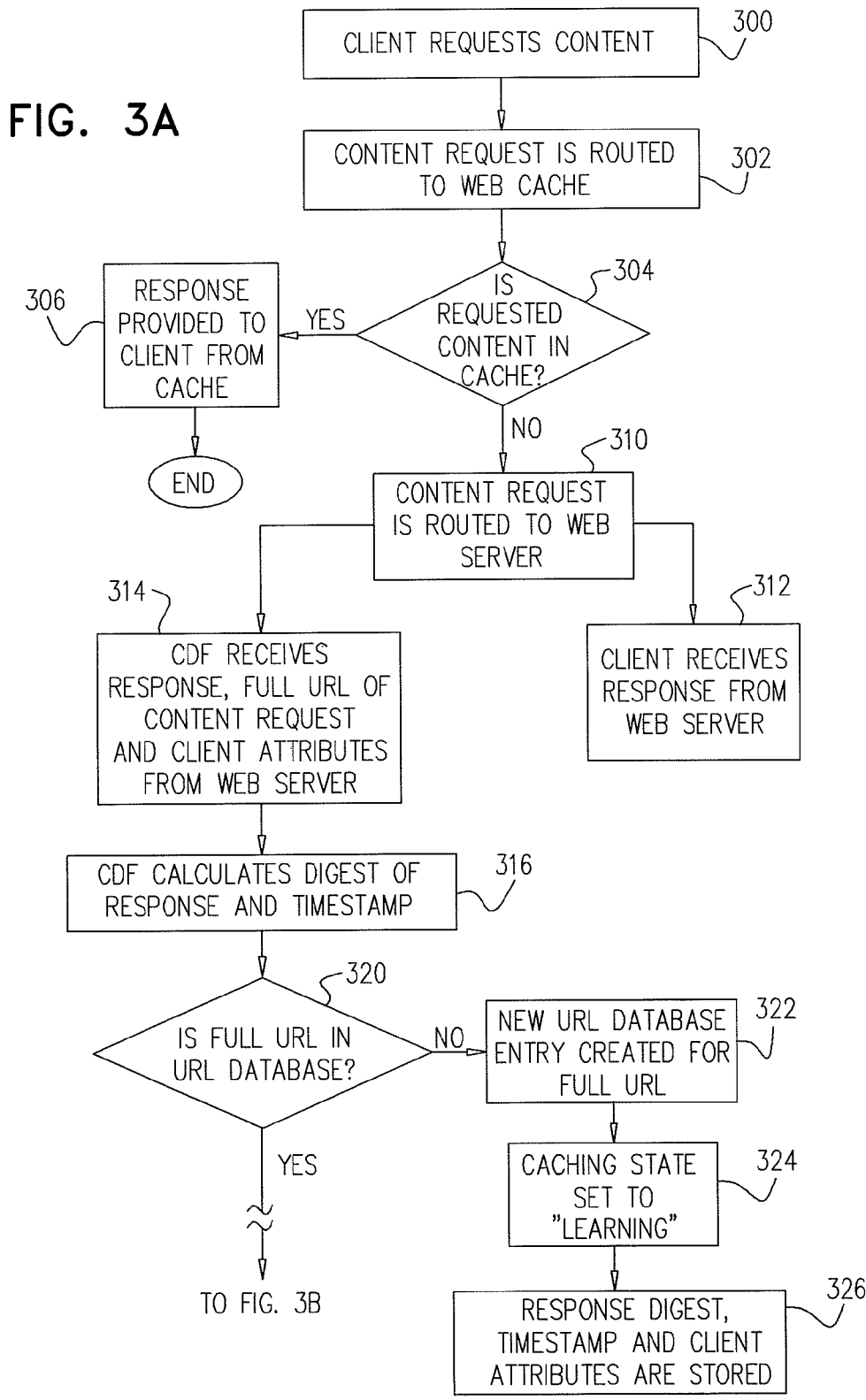

Reference is now made to FIGS. 3A & 3B, which together are a simplified flow chart illustrating the operation of content distinguishing functionality (CDF) forming part of the system of FIGS. 1-2B. Preferably, the system also comprises a web cache such as web caching proxy 112 of FIGS. 2A & 2B, which cache stores static and pseudodynamic content elements which are each associated with a full URL and a caching expiration time.

As shown in FIG. 3A, initially, a content request made by a client (300) and preferably comprising a full URL is preferably routed to the web cache (302), and the cache ascertains whether the requested content is stored in the cache (304). In a case where the requested content is stored in the cache the cache provides the client with a response from the stored content (306).

In a case where the requested full URL is not stored in the cache, or in a case where the content request includes a directive to avoid utilizing a cache, the request is routed to a web server (310) which hosts the requested full URL, and the response from the web server is preferably parallelly or sequentially received by both the client (312) and by the CDF (314).

The CDF preferably includes a URL database which comprises a list of full URLs previously processed by the CDF. For each processed full URL the database preferably includes information pertaining to received responses to requests which comprised the full URL, and a caching state associated with the full URL.

For each response routed to the CDF from a web server, the CDF receives the full URL of the corresponding request and attributes of the client which made the request, such as for example, source IP, session ID, user agent and screen size. The CDF also receives or calculates a digest of the response and a timestamp of the response (316).

The CDF then ascertains whether the full URL has been stored in the URL database (320). If the full URL has not been stored in the URL database, a new entry corresponding to the full URL is created in the URL database (322), the caching state of the full URL is set as "learning" (324), and the digest of the response, the timestamp of the response and the attributes of the client are stored in the new entry (326).

If the full URL has been stored in the URL database, the CDF then ascertains whether the caching state of the full URL is "learning" (328). If the caching state of the full URL is "learning", the CDF then ascertains whether the digest of the response is identical to the stored digest (330).

If the digest of the response is identical to the stored digest, the attributes of the client which made the request are added to the entry (332). The CDF then ascertains whether all of the following conditions exist:
  a predefined learning time has elapsed since the caching state of the full URL was initially set as "learning" (334); and
  a predefined sufficient variety of client attributes have been stored over a predefined minimum number of responses associated with the full URL (336). The variety of client attributes may include, for example, a minimum number of distinct IP addresses in combination with a minimum number of distinct user agents.

If the aforementioned conditions exist, the caching state of the full URL is set as "pseudodynamic" (338), and the response is stored in the cache with a predefined caching expiration time (340). The predefined caching expiration time is typically shorter than the learning time.

If the digest of the current response is not identical to the stored digest, the caching state of the full URL is set as "dynamic" (350), and the timestamp of the current response is saved in the entry (352).

If the state of the full URL is not "learning", the CDF then ascertains whether the caching state of the full URL is "pseudodynamic" (360). If the state of the full URL is "pseudodynamic", a response to the client was apparently not made available by the cache, for example, due to expiration of the predefined caching expiration time for this full URL, or due to the client's specific directive to avoid utilizing a cache. The CDF ascertains whether the digest of the response which corresponds to the full URL is identical to the stored digest (362). If the digest of the response is identical to the stored digest, the response is stored in the cache with a new predefined caching expiration time associated therewith (364). It is appreciated that the new predefined caching expiration time may be equal or not equal to the initial predefined caching expiration time. If the digest of the response which corresponds to the full URL is not identical to the stored digest, the caching state of the full URL is set as "learning" (366), and the digest of the response, the timestamp of the response and the attributes of the client are stored in the entry corresponding to the full URL (368).

If the state of the full URL is not "pseudodynamic", the CDF then ascertains whether the caching state of the full URL is "dynamic" (370). If the state of the full URL is "dynamic", the CDF ascertains whether a predefined amount of refresh time has elapsed since the timestamp stored in the entry corresponding to the full URL (372). If so, the caching state of the full URL is set as "learning" (366), and the digest of the response, the timestamp of the response and the attributes of the client are stored in the entry (368).

It will be appreciated by persons skilled in the art that the present invention is not limited by what has been particularly shown and described hereinabove. Rather, the invention also includes various combinations and subcombinations of the features described hereinabove as well as modifications and variations thereof, which would occur to persons skilled in the art upon reading the foregoing and which are not in the prior art.

The invention claimed is:

1. A system for caching content comprising:
  a server supplying at least one of static and non-static content elements;
  content distinguishing functionality operative to categorize elements of said non-static content as being either dynamic content elements or pseudodynamic content elements; and
  caching functionality operative to cache said pseudodynamic content elements;
  said static content elements being content elements which are identified by at least one of said server and metadata associated with said content elements as being expected not to change for at least a predetermined period of time;
  said non-static content elements being content elements which are not identified by said server and/or by metadata associated with said content elements as being static content elements;
  said pseudodynamic content elements being non-static content elements which, based on observation of a digest value of the byte sequence thereof, are not expected to change, said observation of said digest value of said byte sequence comprising a combination of:
    comparing a stored digest value of a byte sequence of at least one historical response to at least one historical request for a URL with a current digest value of a byte sequence of a current response to a current request for said URL;
    comparing a timestamp of said stored digest value of said byte sequence of said at least one historical response to said at least one historical request for said URL with a timestamp of said current digest value of said byte sequence of said current response to said current request for said URL; and
    ascertaining that a predefined sufficient variety of client attributes have been stored in association with said at least one historical request for said URL, said sufficient variety of client attributes comprising at least a predefined number of distinct IP addresses of clients originating said at least one historical request; and
  said dynamic content elements being non-static content elements which are not pseudodynamic.

2. A system for caching content according to claim 1 and wherein said content distinguishing functionality is operative to distinguish between said dynamic content and said pseudodynamic content by distinguishing between content downloaded to disparate clients that has a changing byte content and content that has a static byte content.

3. A system for caching content according to claim 1 and wherein said caching functionality is operative to ascertain whether said content is cached upon receiving a content request from a client, said content request comprising a full URL.

4. A system for caching content according to claim 3 and wherein said caching functionality is operative to provide said content to said client upon ascertaining that said content is cached.

5. A system for caching content according to claim 3 and wherein said caching functionality is operative to route said content request to a web server which hosts said full URL upon ascertaining that said content is not cached.

6. A system for caching content according to claim 5 and wherein said client is operative to receive a response from said web server to said content request.

7. A system for caching content according to claim 5 and wherein said content distinguishing functionality is operative to receive a response from said web server to said content request.

8. A system for caching content according to claim 7 and wherein said content distinguishing functionality comprises a URL database which stores a list of previously processed full URLs which were previously processed by said content distinguishing functionality.

9. A system for caching content according to claim 8 and wherein said URL database stores a caching state associated with said previously processed full URL for each previously processed full URL stored in said URL database.

10. A system for caching content according to claim 9 and wherein said content distinguishing functionality is also operative to receive said full URL and attributes of said client.

11. A system for caching content according to claim 10 and wherein said attributes include source IP, session ID, user agent and screen size.

12. A system for caching content according to claim 9 and wherein said content distinguishing functionality is also operative to receive a digest of said response and a timestamp of said response.

13. A system for caching content according to claim 9 and wherein said content distinguishing functionality is also operative to calculate a digest of said response and a timestamp of said response.

14. A system for caching content according to claim 9 and wherein said content distinguishing functionality is also operative to ascertain whether said full URL is stored in said URL database.

15. A system for caching content according to claim 14 and wherein said content distinguishing functionality is operative to store said full URL, said digest, said timestamp and said attributes in said URL database and to set a stored caching state corresponding to said full URL to "learning" when said full URL is not stored in said URL database.

16. A system for caching content according to claim 15 and wherein said content distinguishing functionality is also operative to ascertain whether said stored caching state corresponding to said full URL is one of "learning", "pseudodynamic" and "dynamic" when said full URL is stored in said URL database.

17. A system for caching content according to claim 16 and wherein said content distinguishing functionality is also operative to ascertain whether said digest is identical to a stored digest corresponding to said URL when said stored caching state is "learning".

18. A system for caching content according to claim 17 and wherein said content distinguishing functionality is also operative to store said attributes in said URL database when said digest is identical to a stored digest corresponding to said URL, and responsive to a predefined learning time having elapsed since said stored caching state was initially set as "learning" and a predefined sufficient variety of client attributes having been stored over a predefined minimum number of responses associated with said URL said content distinguishing functionality is also operative to set said caching state as "pseudodynamic", and to store said response in said cache with a predefined caching expiration time.

19. A system for caching content according to claim 17 and wherein said caching state of said URL is set as "dynamic" and said timestamp is stored when said digest is not identical to a stored digest corresponding to said URL.

20. A system for caching content according to claim 18 and wherein said variety of client attributes comprises a minimum number of distinct IP addresses in combination with a minimum number of distinct user agents.

21. A system for caching content according to claim 18 and wherein said predefined caching expiration time is shorter than said learning time.

22. A system for caching content according to claim 16 and wherein said content distinguishing functionality is also operative to ascertain whether said digest is identical to a stored digest corresponding to said URL when said stored caching state is "pseudodynamic".

23. A system for caching content according to claim 22 and wherein said caching state of said URL is set as "learning" and said digest, said timestamp and said attributes are stored when said digest is not identical to a stored digest corresponding to said URL.

24. A system for caching content according to claim 22 and wherein said response is stored in said cache with a new caching expiration time associated therewith when said digest is identical to a stored digest corresponding to said URL.

25. A system for caching content according to claim 24 and wherein said new caching expiration time is equal to said predefined caching expiration time.

26. A system for caching content according to claim 24 and wherein said new caching expiration time is not equal to said predefined caching expiration time.

27. A system for caching content according to claim 16 and wherein said content distinguishing functionality is also operative to ascertain whether a predefined amount of refresh time has elapsed since a stored timestamp of said URL when said stored caching state is "dynamic".

28. A system for caching content according to claim 27 and wherein said caching state of said URL is set as "learning" and said digest, said timestamp and said attributes are stored in the entry when a predefined amount of refresh time has elapsed since a stored timestamp of said URL.

29. A method for caching content comprising:
supplying at least one of static and non-static content elements;
categorizing elements of said non-static content as being either dynamic content elements or pseudodynamic content elements; and
caching said pseudodynamic content;
said static content elements being content elements which are identified by at least one of said server and metadata associated with said content elements as being expected not to change for at least a predetermined period of time;
said non-static content elements being content elements which are not identified by said server and/or by metadata associated with said content elements as being static content elements;
said pseudodynamic content elements being non-static content elements which, based on observation of a digest value of the byte sequence thereof, are not expected to change, said observation of said digest value of said byte sequence comprising a combination of:
comparing a stored digest value of a byte sequence of at least one historical response to at least one historical request for a URL with a current digest value of a byte sequence of a current response to a current request for said URL;
comparing a timestamp of said stored digest value of said byte sequence of said at least one historical response to said at least one historical request for said URL with a timestamp of said current digest value of said byte sequence of said current response to said current request for said URL; and ascertaining that a predefined sufficient variety of client attributes have been stored in association with said at least one historical request for said URL, said sufficient variety of client attributes comprising at least a predefined number of distinct IP addresses of clients originating said at least one historical request; and said dynamic content elements being non-static content elements which are not pseudodynamic.

30. A method for caching content according to claim 29 and wherein said categorizing comprises distinguishing between said dynamic content and said pseudodynamic content by distinguishing between content downloaded to disparate clients that has a changing byte content and content that has a static byte content.

31. A method for caching content according to claim 29 and wherein said categorizing also comprises ascertaining whether said content is cached upon receiving a content request comprising a full URL from a client.

32. A method for caching content according to claim 31 and wherein said categorizing comprises providing said content to said client upon ascertaining that said content is cached.

33. A method for caching content according to claim 31 and wherein said categorizing comprises routing said content request to a web server which hosts said full URL upon ascertaining that said content is not cached.

34. A method for caching content according to claim 33 and wherein said client is operative to receive a response from said web server to said content request.

35. A method for caching content according to claim 33 and wherein said categorizing also comprises receiving a response from said web server to said content request.

36. A method for caching content according to claim 35 and wherein said categorizing also comprises storing a list of previously processed full URLs.

37. A method for caching content according to claim 36 and wherein a caching state associated with said previously processed full URL is stored for each stored previously processed full URL.

38. A method for caching content according to claim 37 and wherein said categorizing also comprises receiving said full URL and attributes of said client.

39. A method for caching content according to claim 38 and wherein said attributes include source IP, session ID, user agent and screen size.

40. A method for caching content according to claim 37 and wherein said categorizing also comprises receiving a digest of said response and a timestamp of said response.

41. A method for caching content according to claim 37 and wherein said categorizing also comprises calculating a digest of said response and a timestamp of said response.

42. A method for caching content according to claim 37 and wherein said categorizing also comprises ascertaining whether said full URL is stored in said URL database.

43. A method for caching content according to claim 42 and wherein said categorizing comprises storing said full URL, said digest, said timestamp and said attributes and setting a stored caching state corresponding to said full URL to "learning" when said full URL is not stored.

44. A method for caching content according to claim 43 and wherein said categorizing also comprises ascertaining whether said stored caching state corresponding to said full URL is one of "learning", "pseudodynamic" and "dynamic" when said full URL is stored.

45. A method for caching content according to claim 44 and wherein said categorizing also comprises ascertaining whether said digest is identical to a stored digest corresponding to said URL when said stored caching state is "learning".

46. A method for caching content according to claim 45 and wherein said caching state of said URL is set as "dynamic" and said timestamp is stored when said digest is not identical to a stored digest corresponding to said URL.

47. A method for caching content according to claim 45 and wherein said categorizing also comprises storing said attributes when said digest is identical to a stored digest corresponding to said URL, and responsive to a predefined learning time having elapsed since said stored caching state was initially set as "learning" and a predefined sufficient variety of client attributes having been stored over a predefined minimum number of responses associated with said URL said categorizing also comprises setting said caching state as "pseudodynamic", and caching said response with a predefined caching expiration time.

48. A method for caching content according to claim 47 and wherein said predefined caching expiration time is shorter than said learning time.

49. A method for caching content according to claim 47 and wherein said variety of client attributes comprises a minimum number of distinct IP addresses in combination with a minimum number of distinct user agents.

50. A method for caching content according to claim 44 and wherein said categorizing also comprises ascertaining whether said digest is identical to a stored digest corresponding to said URL when said stored caching state is "pseudodynamic".

51. A method for caching content according to claim 50 and wherein said caching state of said URL is set as "learning", and said digest, said timestamp and said attributes are stored when said digest is not identical to a stored digest corresponding to said URL.

52. A method for caching content according to claim 50 and wherein said response is cached with a new caching expiration time associated therewith when said digest is identical to a stored digest corresponding to said URL.

53. A method for caching content according to claim 52 and wherein said new caching expiration time is not equal to said predefined caching expiration time.

54. A method for caching content according to claim 52 and wherein said new caching expiration time is equal to said predefined caching expiration time.

55. A method for caching content according to claim 44 and wherein, said categorizing also comprises ascertaining whether a predefined amount of refresh time has elapsed since a stored timestamp of said URL when said stored caching state is "dynamic".

56. A method for caching content according to claim 55 and wherein said caching state of said URL is set as "learning", and said digest, said timestamp and said attributes are stored in the entry when a predefined amount of refresh time has elapsed since a stored timestamp of said URL.

57. A content distinguishing method operative in a system for serving content comprising:

a server supplying at least one of static content and non-static content, said content distinguishing method comprising categorizing elements of said non-static content as being either dynamic content elements or pseudodynamic content elements; and caching functionality operative to cache said pseudodynamic content;

said static content comprising content elements which are identified by at least one of said server and metadata associated with said content elements as being expected not to change for at least a predetermined period of time;

said non-static content comprising content elements which are not identified by said server and/or by metadata associated with said content elements as being static content elements;

said pseudodynamic content comprising non-static content elements which, based on observation of a digest value of the byte sequence thereof, are not expected to change, said observation of said digest value of said byte sequence comprising a combination of:

comparing a stored digest value of a byte sequence of at least one historical response to at least one historical request for a URL with a current digest value of a byte sequence of a current response to a current request for said URL;

comparing a timestamp of said stored digest value of said byte sequence of said at least one historical response to said at least one historical request for said URL with a timestamp of said current digest value of said byte sequence of said current response to said current request for said URL; and ascertaining that a predefined sufficient variety of client attributes have been stored in association with said at least one historical request for said URL, said sufficient variety of client attributes comprising at least a predefined number of distinct IP addresses of clients originating said at least one historical request; and said dynamic content comprising non-static content elements which are not pseudodynamic.

58. A content distinguishing method according to claim 57 and wherein said categorizing comprises distinguishing between said dynamic content and said pseudodynamic content by distinguishing between content downloaded to disparate clients that has a changing byte content and content that has a static byte content.

* * * * *